United States Patent [19]
Sakurai et al.

[11] 4,282,061
[45] Aug. 4, 1981

[54] SYSTEM FOR PREVENTING ERRONEOUS OPERATION OF CONTROL RODS

[75] Inventors: Mikio Sakurai, Mito; Yuichiro Yoshimoto; Shiro Nakamura, both of Hitachi, all of Japan

[73] Assignee: Hitachi, Ltd., Tokyo, Japan

[21] Appl. No.: 13,833

[22] Filed: Feb. 22, 1979

[51] Int. Cl.³ .............................................. G21C 7/06
[52] U.S. Cl. ..................................... 176/20 R; 176/24
[58] Field of Search .................. 176/19 R, 20, 22, 24, 176/60, 65, 86 R

[56] References Cited
U.S. PATENT DOCUMENTS

| | | | |
|---|---|---|---|
| 2,927,070 | 3/1960 | Shong, Jr. | 176/24 |
| 3,706,921 | 12/1972 | Rosen | 176/22 |
| 3,890,607 | 6/1975 | Pelene et al. | 176/19 R |
| 3,933,580 | 1/1976 | Aleite et al. | 176/20 R |
| 4,016,034 | 4/1977 | Musick | 176/24 |
| 4,055,463 | 10/1977 | Torres | 176/24 |

Primary Examiner—S. A. Cangialosi
Attorney, Agent, or Firm—Craig and Antonelli

[57] ABSTRACT

System for preventing erroneous operation of control rods for securing a safety control of a nuclear reactor. The erroneous operation preventing system is comprised of a control rod objective position setting means for setting an objective position of a control rod, a control rod position detector for detecting a position of the control rod, and an operation means which operates a difference between the objective position set up and the detected position of the control rod being operated and produces a signal for blocking the control rod operation when the control rod is operated so that the difference goes away from zero. The erroneous operation blocking system stops the control rod at the first possible control rod stopping position. The erroneous operation preventing system includes a return operation commanding unit for compensating for erroneous operation of the control rod when the control rod is erroneously operated.

14 Claims, 7 Drawing Figures

SYSTEM FOR PREVENTING ERRONEOUS OPERATION OF CONTROL RODS

BACKGROUND OF THE INVENTION

This invention relates to a monitoring and controlling system for a nuclear reactor control rod drive system and, more particularly, a system for preventing erroneous operation of control rods due to erroneous operation of control rod driving means or erroneous manual operation of the control rod.

The control rod is used to maintain uniform output distribution in the nuclear reactor and control the reactivity. In most reactors, the reactivity is controlled in a manner that control rods made of neutron absorbing materials are moved into and out of a reactor core. One of the most important requirements in the reactor control is to secure a sufficient safety in fission reaction. For this, continuous care must fully be taken for the control system of the control rods.

In the prior art, a control rod worth minimizer and a rod block monitor have been used for monitoring drive of the control rods.

The control rod worth minimizer monitors movements of the control rods included in a group selected from all the control rods distributed in the reactor core, and blocks the movement of a control rod which is not included in the selected group when such a control rod is erroneously operated before the control rods of the selected group are withdrawn to a predetermined position. The rod worth minimizer serves to monitor control rods operation by an operator on the basis of a predetermined withdrawal/insertion sequence (CR sequence) of the control rods which is previously stored in a computer. Monitoring by the control rod worth minimizer is made for a plurality of group in a predetermined order. Thus, the minimizer with such a function makes uniform the reactivity suppressing abilities of a number of the control rods which are inserted in the reactor core, preventing undesirable withdrawal of a specific control rod which results in unexpected increase of the reactivity. The ability is called a control rod value. The minimizer usually operates at the incipient stage of the reactor starting operation, that is, in the range of power levels of 0% to 20-30% of the rated power. In higher power levels exceeding this range, finer control is required for the control rod operation. However, it is very difficult to change the CR sequence stored in the minimizer. In the higher power levels, it is also difficult to analytically prepare a CR sequence. In other words, it is undesirable from a view point of operation flexibility that the CR sequence once prepared and stored restricts all the operations related. It is for this reason that the rod block monitor is used for monitoring the control rod operation at the higher power level. The rod block monitor monitors a state of the power level of a reactor core by using an amount of neutrons detected by neutron measuring devices. The rod block monitor generates a signal to block the operation of a control rod at the time that an output of the neutron measuring device becomes equal with or larger than a predetermined value so as to block the operation of the control rod. However, the neutron measuring device detects also fluctuation of neutron quantity arising from variation of neutrons generated in the reactor. Therefore, it must be prevented to produce a signal for blocking the operation of the control rod if the detected quantity of neutrons is within a predetermined fluctuation or tolerance of the neutrons. For this reason, a set value for producing the block signal is set up at a power level 5 to 10% higher than the rated power output of the nuclear reactor. This brings about a problem that the blocking of the control rod operation is delayed.

At present, stability analysis of the nuclear reactor proves that when both the control rod value minimizer and the rod block monitor are applied for the control rod operation, safety of the nuclear reactor can be ensured even if a control rod is erroneously withdrawn due to the erroneous operation of associated apparatus or by an operator. However, if the erroneous operation of the control rod may be blocked at the initial stage of the erroneous operation, admitted range of the operation of the nuclear reactor is extended to increase the reactor power output.

SUMMARY OF THE INVENTION

Accordingly, an object of the present invention is to provide a system for preventing an erroneous operation of control rods which can block the operation of a control rod at the first possible stop position when the control rod is erroneously operated.

Another object of the invention is to provide a system for preventing an erroneous operation of control rods which detects an erroneous operation of a control rod and then returns the control rod to a correct position.

A still another object of the invention is to provide a system for preventing an erroneous operation of the control rods without using neutron measuring devices.

The erroneous operation preventing system according to the invention is to provide an erroneous operation preventing means for a control rod, means for setting an objective position of the control rod, means for detecting a position of the control rod and a processing unit for delivering a signal for blocking the control rod operation when the control rod is operated in such a direction that a difference between the objective position of the control rod and detected position of the control rod goes away from zero. The processing unit further may produce a return-operation starting signal after releasing the blocking of the control rod operation for the purpose of returning the control rod to the objective position.

DESCRIPTION OF THE PREFERRED EMBODIMENTS

Before descriptions of the embodiments of a system for preventing erroneous operation of control rods according to the invention, the blocking of a control rod by a conventional rod block monitor will further be described with reference to FIG. 1.

Figure 1:
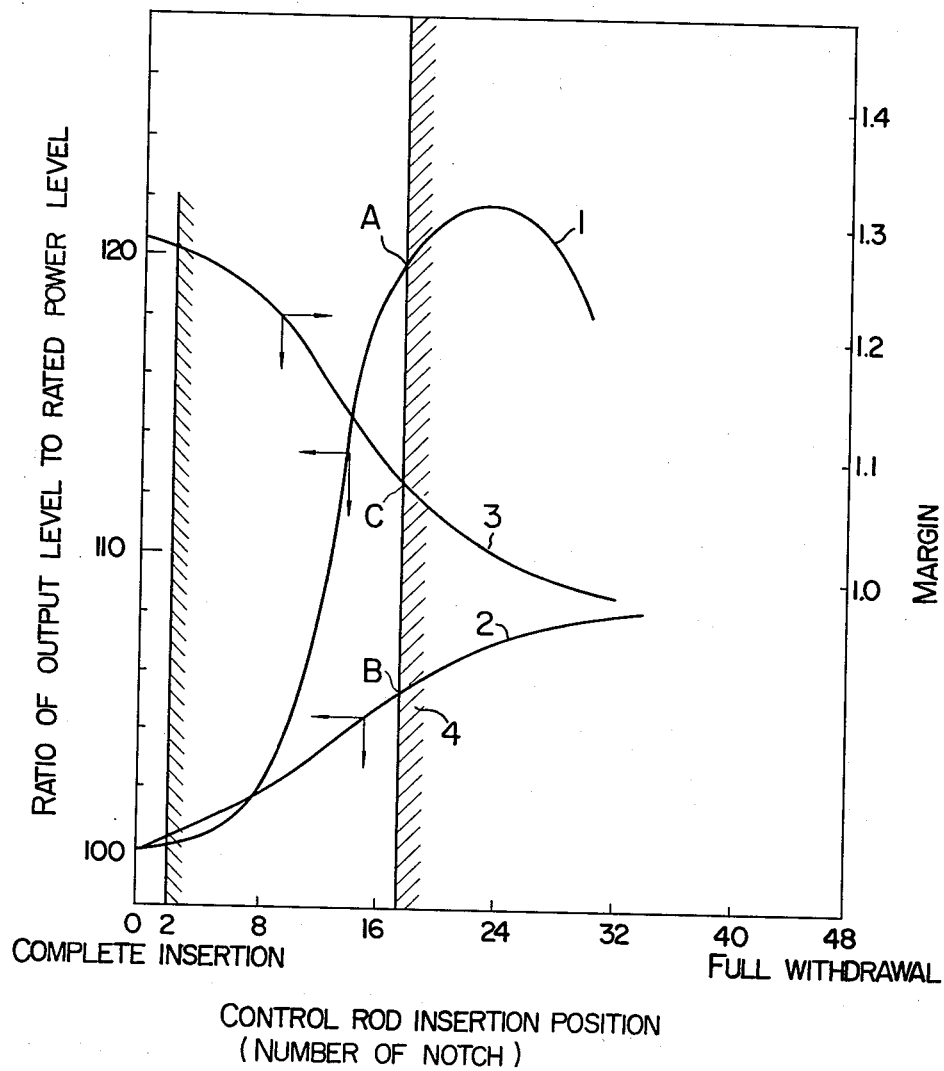
FIG. 1 shows characteristics of the maximum surface heat flow of a fuel rod, a reactor power output and a thermal-hydrodynamic margin with respect to inserted positions of a control rod.

A graph shown in FIG. 1 illustrates characteristics of the maximum surface heat flow a of a fuel rod, a power output b of a nuclear reactor and a thermohydrodynamic margin c with respect to the respective points in the path of the withdrawal of a control rod, i.e. the respective insertion positions (notch positions) of the control rod, when the control rod fully inserted is erroneously withdrawn in succession when the nuclear reactor is operated at the rated power. In FIG. 1, reference numeral 1 designates a curve representative of the maximum surface heat flow a of a fuel rod; 2 a curve representative of the power output b of a nuclear reactor; 3 a curve representative of the thermal-hydrodynamic margin c. The blocking of withdrawal of the control rod by the conventional rod block monitor is performed in the partial area of about 18 notches or more which is shown by a hatched area 4 in FIG. 1. The nuclear reactor is designed with a sufficient margin for the rises of the heat flow a and the reactor power output b and the reduction of the thermal-hydrodynamic margin c. However, if blocking of the withdrawal of the control rod can be made at an earlier stage, it is possible to perform the withdrawal blocking before the indices a, b and c change greatly to reach A, B and C (those A, B and C indicate values at the cross points where the curves 1, 2 and 3 intersect the lower limit line of the area 4) as shown in the figure. In other words, if the earlier stage blocking become possible, the initial values of the indicies a, b and c in a normal operating condition of the reactor can be approached to nearly limit values A, B and C, thereby increasing the reactor power output.

The reason why the prior art rod block monitor takes a relatively long time till the withdrawal blocking is that a set or reference value for judgement of whether the blocking operation of the control rod is necessary or not can not be set up closest to the rated output level. The signal of the neutron measuring device is dependent on the fluctuation of the neutron in the reactor core. In general, the set value is selected higher by 5 to 10% than the rated output to avoid undesirable rod blocking due to the fluctuation. This is one of the causes of the delayed blocking operation.

Figure 2:
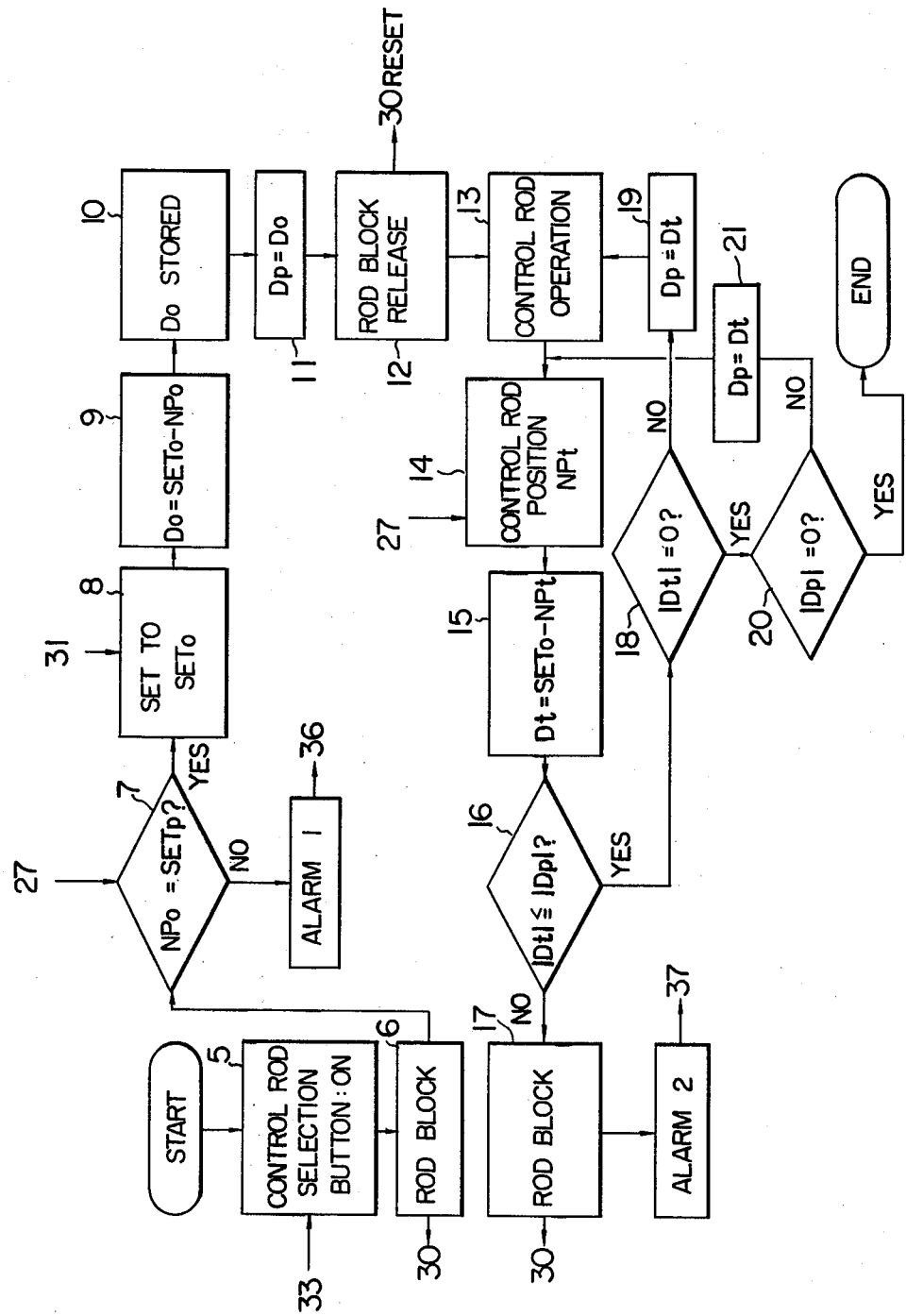
FIG. 2 shows a flow chart illustrating an example of logic for preventing an erroneous operation of control rods according to the invention.

Embodiments of the erroneous operation preventing system according to the invention will be described in detail with reference to FIGS. 2 to 7. A flow chart shown in FIG. 2 shows the logic for an embodiment of the system for preventing an erroneous operation of control rods. At a processing step 5, a selection button 33 for the control rods, provided on an operation board 26 shown in FIG. 4 is actuated. Upon the actuation of the selection button, the rod block is automatically established at a processing step 6 and a control rod operation blocking unit 30 for blocking the control rod operation (including automatic and manual operations) operates. At the next step 7, it is checked whether the last time or previous operation of the control rod was carried out as required or not and whether the control rod position was moved due to some external causes after the previous control rod operation. In other words, it is checked whether or not the present control rod position $NP_o$ detected by a control rod position detector 27 is equal to a position $SET_p$ set as the final position in the previous operation of the control rod. This may be checked by checking D=0 or not when $SET_p - NP_o = D$ is set. When D≠0, an alarm lamp 36 (alarm 1) on the operation board 26 shown in FIG. 4 lights up to give an alarm. When D=0, a control rod objective position setting unit 31 on the operation board 26 sets an objective position of the control rod to $SET_o$, at a step 8. At a step 9, a difference between the present control rod position $NP_o$ and the position $SET_o$ is operated and at a step 10 the difference $D_o$ is stored. At a step 11, the difference $D_o$ is set equal to a processing difference $D_p$, i.e. $D_o = D_p$ and at a step 11 the blocking unit 30 is reset to release the rod block. Upon the release of the rod block, a step 13 causes a control rod drive unit 25 to start the operation of the control rod. Then, at a step 14, a control rod position detector 27 shown in FIG. 3 detects the control rod position $NP_t$ during the movement of the rod at a monitoring time and a step 15 operates a difference $D_t$ between the objective position $SET_o$ of the control rod and the detected control rod position $NP_t$. At a processing step 16, the absolute values $D_t$ and $D_p$ are compared to judge whether an actual control rod operation approaches successively to the objective position or not. When the relation $|D_t| \leq |D_p|$ does not hold, that is to say, the control rod operation does not approach to the target value, a step 17 makes a rod block again to give an alarm by means of an alarm lamp 37 (alarm 2). When the relation $|D_t| \leq |D_p|$ holds, a step 18 judges whether $|D_t| = 0$ or not. In the judgement, when $D_t \neq 0$, a step 19 returns to the step 13, with setting $D_t$ as a new processing difference $D_p$, in order to continue the control rod operation. Then, the loop mentioned above is repeated.

When $|D_t| = 0$, a step 20 judges whether $|D_p| = 0$ or not. When $D_p \neq 0$, a step 21 repeats the above-mentioned loop, with setting $D_t$ as a new processing difference $D_p$. When $|D_p| = 0$, the operation ends. It is noted here that operations in the steps 14 to 16, and 18 to 21 can be accomplished within only one position (one notch) movement of the control rod and, therefore, when the control rod is erroneously operated in succession, the erroneous operation of the control rod can be prevented by an operation blocking signal being generated before only the control rod movement to the next position. In other words, after the rod operation in an abnormal direction is detected, the control rod operation can be blocked at the first neighbouring stopping position.

Figure 3:
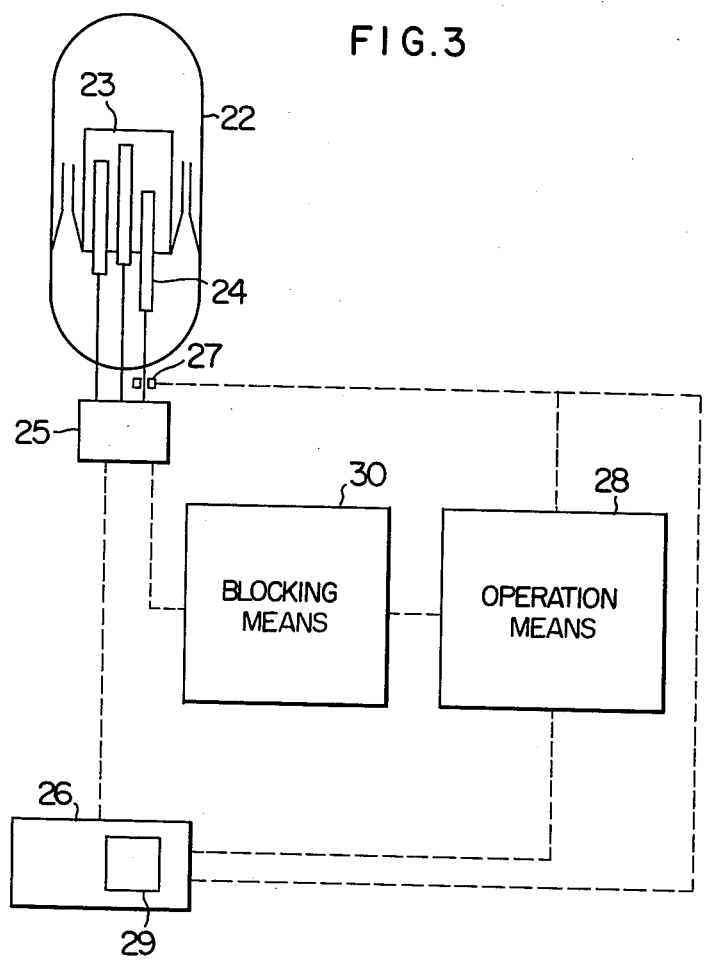
FIG. 3 shows a block diagram of an embodiment of the control rod erroneous operation preventing system according to the invention.
Figure 4:
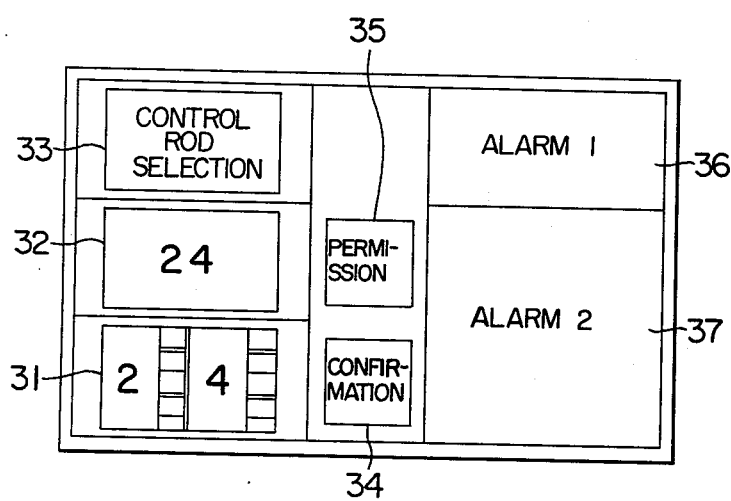
FIG. 4 shows an example of an operation board of the erroneous operation preventing system shown in FIG. 3.

FIG. 3 shows a block diagram of an embodiment of the system for preventing an erroneous operation of control rods according to the invention using the logic chart illustrated in FIG. 2. In this example, the erroneous operation preventing system is applied to a boiling water reactor. In FIG. 3, a reactor core 23 housed in a nuclear reactor 22 is controlled by control rods 24. The control rods 24 are driven by a control rod driving unit 25 to stop the control rods at positions specified by signals delivered from an operation board 26. The control rod stop position (notch position) is detected by a control rod position detector 27 and then is displayed by a display (shown in FIG. 4) provided on the operation board 26. The logic circuit to execute the logic shown in FIG. 2 is housed in a logic operation unit 28 and starts the logic operation and the judging operation by a controller 29 on the operation board. When the control rod operation must be blocked in the course of logic operation, the logic operation unit 28 produces a control rod operation blocking signal (rod block signal) to be supplied to a control rod blocking unit 30 to stop the movement of the control rod 24. The control rod drive unit 25 and the control rod position detector 27 are well known. (See, for example, "The Thermal Hydraulics of a Boiling Water Nuclear Reactor" R. P. Lahey Jr., American Nuclear Society, 1977, pp. 29–33, with respect to the control rod drive unit). Since it is easy for one skilled in the art to constitute logic circuits for performing the above mentioned logic operations by using any prior art circuits, detailed explanations of such prior art circuits are omitted. Furthermore, a computer can be used to perform the logic operations, and programs for driving the computer can easily be prepared by one skilled in the art from the flow charts shown in the Drawings and the disclosures of the present invention.

FIG. 4 shows an arrangement of the operation board. The operation board is able to control selectively each control rod 24. The operation board has a control rod objective position setting unit 31 for setting an objective position of each control rod, a present position indicator 32 for indicating a present position of the control rod, a selection button 33 for selecting any one of the control rods 24, a confirmation button 34, a permission lamp 35 for indicating the release of the rod block at the processing step 12 in FIG. 2, a lamp 36 for alarm 1, a lamp 37 for alarm 2. Through the operation board, an instruction by an operator is supplied to the logic operation unit 28 and an alarm or a permission signal are displayed by the corresponding lamps.

The following advantages can be obtained by the embodiment mentioned above.

(1) It can be confirmed by checking the alarm lamp being not lit before operation of a selected rod, that the control rod 24 has stopped at a predetermined position in accordance with a certain control rod withdrawal sequence. Accordingly, avoidable is greater damage of the fuel which may be caused by the possible larger control rod withdrawal which will occur if such a confirmation is not made.

(2) The control rod operation is monitored in a manner that a predetermined objective position for the control rod operation is selected and the present position of the control rod 24 is compared with the objective value. Therefore, a high reliability of the control rod operation is ensured.

(3) The number of notches of erroneous control rod withdrawal when the rod is erroneously operated (positions at which a control rod can be stopped are called notch positions and the control rod position detector 27 is provided with a total of 48 detectors each located at the notch position and between adjacent notch positions) can be limited to mere one notch. In other words, the control rod can be blocked at the first possible stopping position so that the impact by the rod against the fuel may be minimized.

Figure 5:
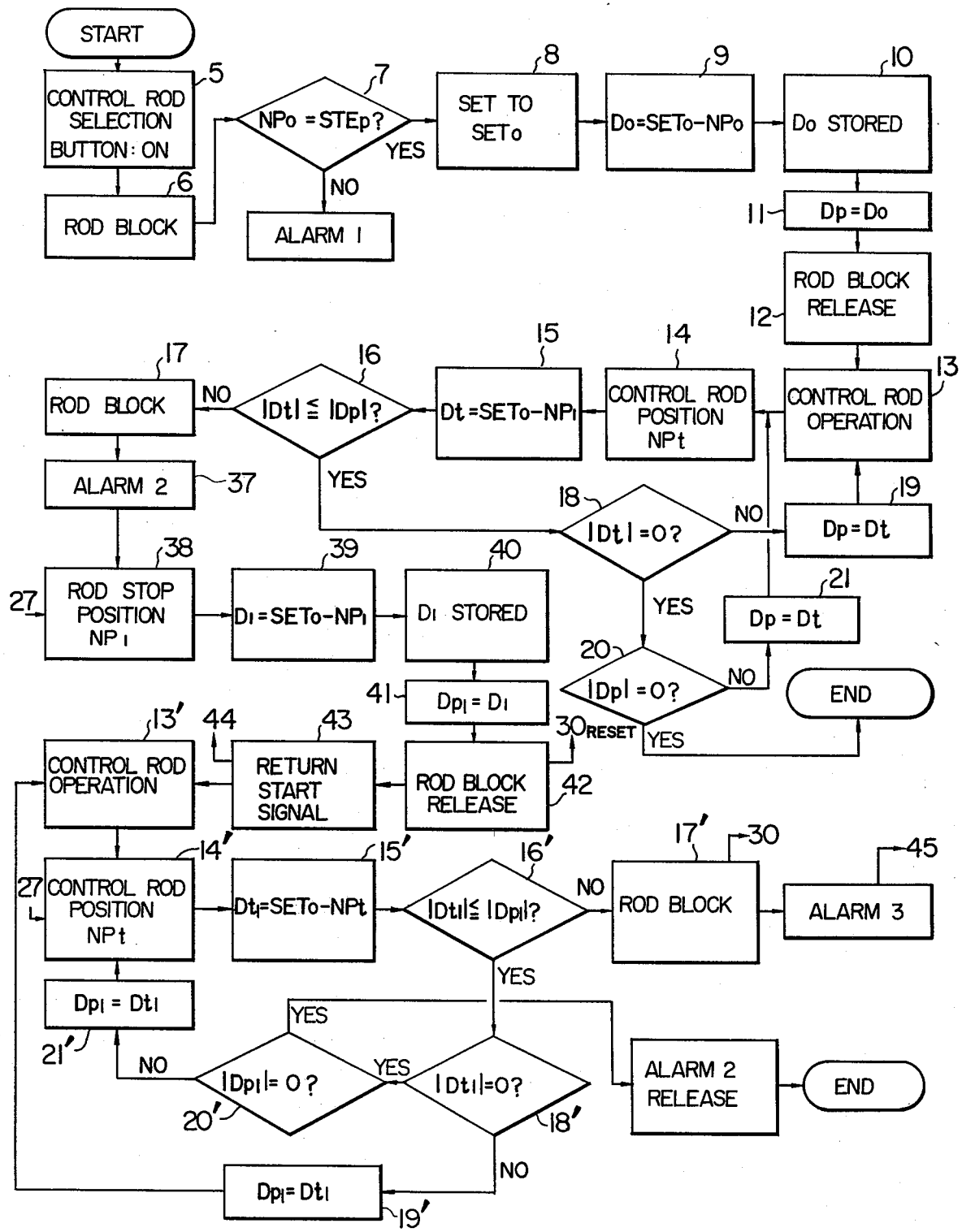
FIG. 5 shows a flow chart of another example of the logic for carrying out the erroneous operation prevention according to the invention.

Turning now to FIG. 5, there is shown another logic for the system of the invention. The logic from the processing of the start to the processing of the alarm 2 is substantially equal to that shown in FIG. 2. Of course, the alarm 2 is generated when the control rod is operated erroneously inverse to the operation intended by an operator. Thus, the following logic is added after the processing of the alarm 2. At a processing step 38, a control rod stopping position NP1 is given by a signal from the position detector 27. Then, at the step 39 a difference D1 between the set value SETo and NP1 is calculated and at the step 40 the difference D1 is stored. At the processing step 41 the difference D1 is renewed to a new processing difference $D_{pl}$ and at the step 42 the rod block is released. The step 43 generates a return operation start signal and the step 13' causes a return operation command unit 44 to operate the driving unit 25. As a result, the control rod operation starts again. The succeeding processings 14' to 21' are similar to those 14 to 21. However, when the rod block is resumed at the processing step 17', an alarm (alarm 3) is given to the lamp 45 on the operation board in FIG. 7. When $|D_{pl}|=0$ at the processing step 20', the alarm 2 is released and the operation ends. In this manner, the return operation is executed to return erroneously operated control rod to a normal position.

Figure 6:
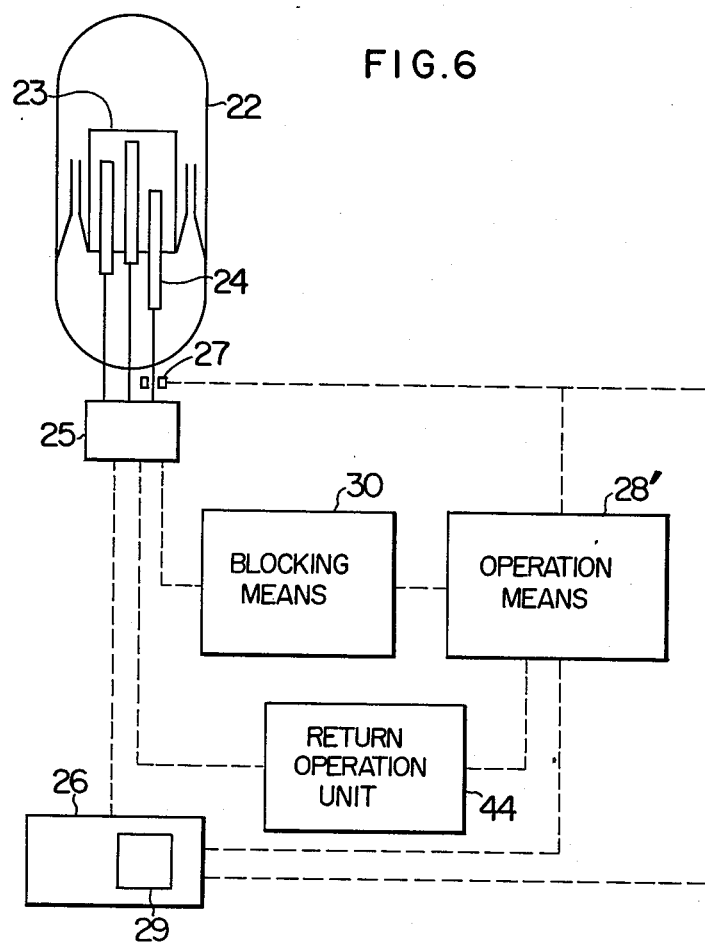
FIG. 6 shows a block diagram of another embodiment of the erroneous operation preventing system according to the invention.

FIG. 6 shows a block diagram of another embodiment of the system of the invention. In this embodiment, the logic shown in FIG. 5 is used and the system is applied to a boiling water reactor as in the case of FIG. 3. In FIG. 6, like reference numerals are used to designate like elements in FIG. 3. A difference of this embodiment from that in FIG. 3 is that the logic operation unit 28' includes a logic circuit for executing the logic shown in FIG. 5, and when the logic operation unit 28' produces a return operation start signal, the return operation command unit 44 operates to cause the control rod driving unit 25 to effect the return operation.

Figure 7:
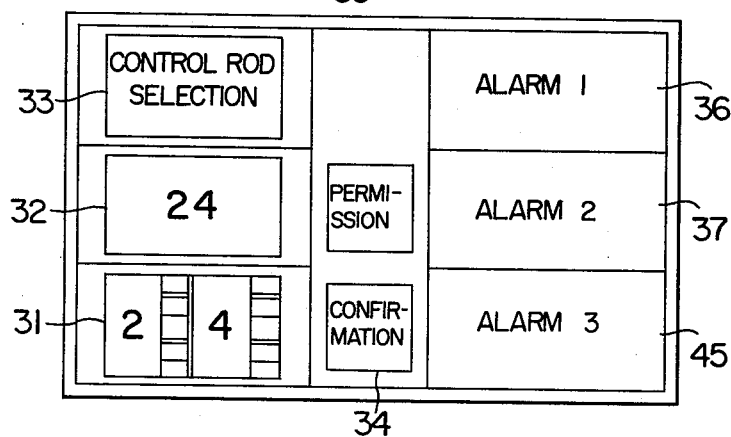
FIG. 7 shows an example of an operation board of the erroneous operation preventing system shown in FIG. 6.

FIG. 7 shows an arrangement of the operation board used in the embodiment in FIG. 6. The arrangement of the operation board in FIG. 7 is the same as that in FIG. 4 except that a lamp 45 for alarm 3 is additionally used.

When a control rod is erroneously driven, the embodiment shown in FIGS. 5 to 7 prevents, corrects and returns it to a normal operation. This embodiment also enjoys the same effects as those of the embodiment shown in FIGS. 2 to 4. The erroneous operation preventing system of the invention may be used in place of the conventional control rod worth minimizer and the rod block monitor and may also be used in combination with those conventional ones.

We claim:

1. A system for preventing erroneous operation of control rods to be inserted in a nuclear reactor comprising:

a control rod objective position setting means for producing an objective position setting signal indicating an objective position of a control rod selected to be driven;

a control rod drive means for moving the selected control rod in the axial direction thereof in said nuclear reactor on the basis of said objective position setting signal;

a control rod position detecting means for detecting a position of the selected control rod to produce a position signal;

an operation means for obtaining a first absolute value representing a difference between said objective position setting signal and the position signal before movement of the selected control rod, and a second absolute value representing a differencce between said objective position setting signal and the position signal during movement of the selected control rod, for comparing said first absolute value with said second absolute value thereby to produce a movement blocking signal when said second absolute value exceeds said first absolute value, and for discriminating, after occurrence of said movement blocking signal, the direction of movement of the selected control rod necessary for approaching said second absolute value to said first absolute value to produce a rod block release signal and a return movement command signal;

a control rod blocking means for stopping operation of said control rod drive means in response to said movement blocking signal and for establishing again an operative condition of said control rod drive means in response to said rod block release signal; and a return operation commanding means for causing said control rod drive means to operate whereby the selected control rod is accurately moved to said objective position thereof.

2. A system for erroneous operation of control rods according to claim 1, wherein said operation means includes:

a memory for storing an absolute value of a difference ($D_l$) between said objective position of said selected control rod and a control rod position of said selected control rod the movement of which was blocking by said blocking signal;

means for setting said absolute value of the difference ($D_l$) as a third absolute value ($D_{pl}$);

means for producing said return operation command signal after the setting of the difference ($D_l$) to start return operation of said selected control rod;

calculating means for calculating an absolute value of a difference ($D_{tl}$) between a position of said selected control rod during the return operation and said objective position of said selected control rod and for setting said absolute value of the difference ($D_{tl}$) as a fourth absolute value ($D_{tl}$); and discriminating means for discriminating which is larger between ($D_{pl}$) and the difference ($D_{tl}$) said third and fourth absolute values.

3. A system for preventing erroneous operation of control rods according to claim 2 wherein said operation means includes:

means for discriminating whether said fourth absolute value ($D_{tl}$) is zero or not when a relation $D_t \leq D_{pl}$ holds; and means for setting said fourth absolute value ($D_{tl}$) as a new third absolute value and continuing control rod return operation when said fourth absolute value ($D_{tl}$) is not zero.

4. A system for preventing erroneous operation of control rods according to claim 2 wherein said operation means includes:

means for discriminating whether said fourth absolute value ($D_{tl}$) is zero or not when a relation $D_{tl} \leq D_{pl}$ holds;

means for discriminating whether said third absolute value ($D_{pl}$) is zero or not when said fourth absolute value ($D_{tl}$) is zero; and means for terminating return operation of said selected control rod when said third absolute value ($D_{pl}$) is zero.

5. A system for preventing erroneous operation of control rods according to claim 2 wherein said operation means includes:

means for discriminating whether said fourth absolute value ($D_{tl}$) is zero or not when a relation $D_{tl} \leq D_{pl}$ holds;

means for discriminating whether said third absolute value ($D_{pl}$) is zero or not when said fourth absolute value ($D_{tl}$) is zero; and means for setting said fourth absolute value ($D_{tl}$) as a new third absolute value when said third absolute value ($D_{pl}$) before the setting of he new third absolute value is not zero.

6. A system for preventing erroneous operation of control rods to be inserted in a nuclear reactor comprising:

a control rod objective position setting means for producing an objective position setting signal indicating an objective position of a control rod selected to be driven;

a control rod drive means for moving the selected control rod in the axial direction thereof in said nuclear reactor on the basis of said objective position setting signal;

a control rod position detecting means for detecting a position of the selected control rod to produce a position signal;

an operation means for obtaining a first absolute value representing a difference between said objective position setting signal and the position signal before movement of the selected control rod, and a second absolute value representing a difference between said objective position setting signal and the position signal during movement of the selected control rod, and for comparing said first absolute value with said second absolute value thereby to produce a movement blocking signal when said second absolute value exceeds said first absolute value; and a control rod blocking means for stopping operation of said control rod drive means in response to said movement blocking signal.

7. A system for preventing erroneous operation of control rods according to claim 6 or 1, wherein said operation means produces said movement blocking signal immediately after said second absolute value exceeds said first absolute value.

8. A system for preventing erroneous operation of control rods according to claim 6 or 1 wherein said control rod objective position setting means includes a selection button for selecting one of said control rods, and said operation means includes means for producing a signal for blocking movement of said selected control rod when said one of control rods is selected by said selection button.

9. A system for preventing erroneous operation of control rods according to claim 6 or 1 wherein said operation means includes means for discriminating a difference between a control rod position detected by said control rod position detecting means before movement of said selected control rod starts, and a position selected as a final position in the previous control rod movement, to produce an alarm signal when this difference is not zero.

10. A system for preventing erroneous operation of control rods according to claim 6 or 1, wherein said operation means produces said movement blocking signal to block the movement of said selected control rod at a first stoppable position.

11. A system for preventing erroneous operation of control rods according to claim 6 or 1, wherein said operation means includes:
- a memory for storing an absolute value of a difference (Do) between said objective position of said selected control rod and a control rod position of said selected control rod before a control rod operation starts;
- means for setting said absolute value of the difference (Do) as said first absolute value (Dp);
- calculating means for calculating an absolute value of a difference (Dt) between a position of said selected control rod being moved and said objective position of said selected control rod and for setting said absolute value of the difference (Dt) as said second absolute value (Dt); and
- discriminating means for discriminating which is larger between (Dp) and the difference (Dt) said first and second absolute values.

12. A system for preventing erroneous operation of control rods according to claim 11, wherein said operation means includes:
- means for discriminating whether said second absolute value (Dt) is zero or not when the relation $Dt \leq Dp$ holds; and
- means for setting said second absolute value (Dt) as a new first absolute value and continuing control rod operation when said second absolute value (Dt) is not zero.

13. A system for preventing erroneous operation of control rods according to claim 11, wherein said operation means includes:
- means for discriminating whether said second absolute value (Dt) is zero or not when a relation $Dt \leq Dp$ holds;
- means for discriminating whether said absolute value (Dp) is zero or not when said second absolute value (Dt) is zero; and
- means for terminating control operation when said first absolute value (Dp) is zero.

14. A system for preventing erroneous operation of control rods according to claim 11, wherein said operation means includes:
- means for discriminating said second absolute value (Dt) is zero or not when a relation $Dt \leq Dp$ holds;
- means for discriminating whether said first absolute value (Dp) is zero or not when said second absolute value (Dt) is zero; and
- means for setting said second absolute value (Dt) as a new first absolute value when said first absolute value (Dp) before the setting of the new first absolute value is not zero.

* * * * *